United States Patent Office 3,420,615
Patented Jan. 7, 1969

3,420,615
METHOD FOR FIXING PHTHALOCYANINE DYESTUFFS ON TEXTILE FIBERS
William S. Griffith, Mount Holly, N.C., assignor to Martin-Marietta Corporation, a corporation of Maryland
No Drawing. Filed Dec. 20, 1965, Ser. No. 515,169
U.S. Cl. 8—37       6 Claims
Int. Cl. C09b 49/00; D06p 1/30; D06p 1/14

The present invention relates to a method for coloring textile fibers, and more particularly to a method for fixing phthalocyanine dyestuffs on textile fibers.

Generally speaking, the method of the present invention is a process for coloring cotton textile fibers, comprising the steps of applying to the fibers an aqueous composition comprising water soluble, organic dyestuff which is a sulfinate of the phthalocyanine series selected from the group consisting of phthalocyanine sulfinates, copper phthalocyanine sulfinates and nickel phthalocyanine sulfinates and containing at least one pendant sulfinate group per phthalocyanine molecule as a substituent for hydrogen in the arylene nuclei of the phthalocyanines and a fixing agent selected from the group consisting of $Na_2S_2O_3$, thiourea, N-monoalkyl- and N,N'-dialkyl thioureas the alkyl groups of which contain 1–6 carbon atoms, $NH_4SCN$, elemental sulfur, acetyl thioureas, trisodium thiocyanurate and sodium diethyldithiocarbamate; drying the fibers; heating the fibers at an elevated temperature until the dyestuff is fixed; and washing the fibers.

If desired, the sulfinates of the phthalocyanine series may also have pendant thiolsulfonate or pendant sulfonate groups as substituents for hydrogen in the arylene nuclei of the phthalocyanines, in addition to the pendant sulfinate groups.

The process of the present invention may be utilized to make valuable green dyeings, having good wet fastness and light fastness, on cotton fibers.

The process of the present invention may be operated in a fast and economical manner without production of offensive waste products which pollute streams.

The following is a more detailed description of the process of the present invention.

Examples of sulfinates of the phthalocyanine series which are suitable for use in the method of the present invention are those disclosed in British patent specification No. 960,643, published June 10, 1964.

However, for reasons of economy, it is preferred to use sulfinates of the phthalocyanine series of the formula

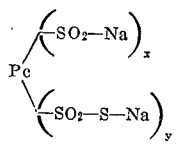

which may be prepared by a process comprising the step of reducing $Pc(SO_2Cl)_n$ in aqueous medium at pH 4–10 with an excess of NaSH or $Na_2S$, wherein Pc is the radical of phthalocyanine, copper phthalocyanine or nickel phthalocyanine, $x$ is a number from 1.2–2.3, $y$ is a number from 0.8–2.3, $n$ is a number from 2–4, and $x+y=n$, which are described and claimed in co-pending U.S. patent application Ser. No. 515,172 now Patent No. 3,318,-918 issued Aug. 29, 1967, filed on even date herewith.

The fixing agents utilized in the present invention are those described above, and thiourea is preferred because of its efficiency as a fixing agent in the present process. Savings may be effected by utilizing urea in combination with the thiourea, in which case the amount of thiourea utilized will be lessened.

In addition to the dyestuff and fixing agent, the aqueous composition may also contain conventional dyebath additives such as wetting agents, leveling agents such as sodium alginate, and NaCl.

The aqueous solution may also advantageously contain urea in combination with any of the fixing agents selected.

The amount of dyestuff utilized will depend upon the depth of shade desired. For most purposes, the aqueous dye composition may contain about 0.4%–5% of the dye calculated as solids, and about 2.5% will be suitable for normal strength dyeings.

The amount of fixing agent utilized will depend upon the amount of dyestuff to be fixed, and it has been found that about two weights of fixing agent be employed for each weight of dye in the aqueous composition. If urea is also employed it is suggested that about four weights of urea be employed for each weight of dye.

It is suggested that the aqueous dye composition be neutral or slightly alkaline when applied to the fibers to prevent damage thereto by strong acid or alkali, and also, if the dye composition is slightly alkaline the alkali appears to catalyze the fixation reaction and shorten the time which would otherwise be required.

In preparing the aqueous dye composition, it is unimportant as to the order in which the components are mixed.

The aqueous dye composition may be applied to the fibers at any reasonable temperature, for example, room temperature −185° F., although penetration of the fibers is more rapid with the dye composition used at about 140° F. when applied.

It is suggested that the aqueous dye composition be applied to the fibers by padding the fibers through a pad box containing the aqueous dye and squeezing the fibers to about 60% wet pick up based on fabric weight.

The fibers are then dried to substantial dryness, such as by means of a housed heated tenter, infrared dryer, hot flue dryer, cylindrical heated cans, by a combination of such means, or by other means.

After the fibers have been dried they are subjected to an elevated temperature until the dystuff is fixed on the fibers. It is suggested that the fibers be subjected to a temperature of 380°–425° F. for a period of 8 seconds–2 minutes to achieve fixation. The source for this heat may be such means as heated cylindrical drying cans, or a gas fired housed tenter.

Following fixation, the fibers are washed to remove any unfixed color, salts, etc., whereafter they may be dried.

For better results, it is suggested that phthalocyanine dyes in which the total of pendant sulfinate and pendant thiolsulfonate groups is 3–4 per molecule be selected.

The following are illustrative examples of the process of the present invention:

Example 1

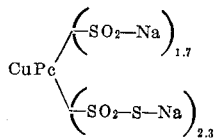

wherein CuPc is the radical of copper phthalocyanine, is prepared by slurrying 97 gms. copper phthalocyanine tetra-(3)-sulfonyl chloride with ice and water to 960 ml. volume at 0° C., adjusting the pH to 7 by adding 15% aqueous NaOH at room temperature to the cold mass, adding 3 drops tributyl phosphate anti-foaming agent, adding 77.9 gms. 43% aqueous NaSH solution at room temperature, warming to room temperature over 1 hour, stirring 3 additional hours. Concentrated HCl is added to adjust the pH to 2 and precipitate the dye in acid form; the dye solids are collected by filtration, washed with water at room temperature and dried.

The aqueous dye composition is prepared by dissolving 25 gms. of the dye solids, 50 gms. thiourea, 100 gms. urea, 30 gms. NaCl and 2.5 gms. sodium alginate in enough water and soda ash to adjust to pH 8 in a final volume of 1 liter.

The aqueous dye composition is padded at 140° F. onto cotton fabric weighing 4 oz. per square yard, the fabric is squeezed to 60% wet pick up based on fabric weight, dried to substantial dryness, passed for 8 seconds over a series of rotating, cylindrical cans heated to 425° F. to fix the dye, rinsed with water at 140° F., scoured and dried.

Example 2

This example is the same as Example 1 above, except that 96.5 gms. nickel phthalocyanine tetra-(4)-sulfonyl chloride is substituted for the copper phthalocyanine tetra-(3)-sulfonyl chloride used in Example 1; except that the amount of thiourea is increased to 100 gms. and urea is omitted; and except that fixation is achieved by heating the fabric in a "thermosol" unit for 90 seconds at 400° F. instead of on cylindrical cans.

Example 3

This example is the same as Example 2 above, except that 90.65 gms. phthalocyanine tetra-(3)-sulfonyl chloride is substituted for the nickel phthalocyanine tetra-(4)-sulfonyl chloride used in Example 2; except that 40 gms. $Na_2S_2O_3 \cdot 5H_2O$ is substituted for the thiourea; and except that heating the fabric for fixation of the dye is at 380° F. for 2 minutes.

Example 4

10 gms. of dried copper phthalocyanine sulfinic acid having an average of 3.4 sulfinic acid groups per molecule, prepared according to Example 4 of British patent specification No. 960,643, published June 10, 1964, and 20 gms. N-monomethylthiourea are dissolved with enough water and soda ash to give a final volume of 1 liter at pH 7.5.

The dye composition is padded onto cotton fabric at 140° F., the fabric squeezed to 60% wet pick up based on fabric weight, dried, and passed through a chamber containing hot air at 400° F. for 60 seconds to fix the dye. The fabric is rinsed with hot water, scoured and dried.

Example 5

This example is the same as Example 4 above, except that the dye is prepared by substituting 9.65 parts nickel phthalocyanine tetra-(4)-sulfonyl chloride for the 9.7 parts copper phthalocyanine tetra-(3)-sulfonyl chloride used in the British patent, whereby a nickel phthalocyanine dye having an average of 3.4 pendant sulfinic acid groups per molecule results; and except that in preparing the dyeing composition 20 gms. of the present dye is substituted and 40 gms. N,N'-dimethylthiourea is substituted for the N-monomethylthiourea used in Example 4.

Example 6

This example is the same as Example 4 above, except that the dye is prepared by substituting 9.09 parts phthalocyanine tetra-(3)-sulfonyl chloride for the 9.7 parts copper phthalocyanine tetra-(3)-sulfonyl chloride used in the British patent, whereby a phthalocyanine dye having an average of 3.4 pendant sulfinic acid groups per molecule results; except that in preparing the aqueous dyeing compositions 40 gms. of the present dye is substituted for the dye used in Example 4, and 40 gms. finely divided elemental sulfur is substituted for the N-monomethylthiourea used in Example 4; and except that the pH of the dye composition is at 8.5.

Example 7

A dyestuff of the formula

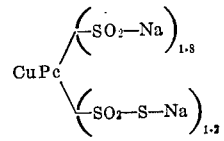

wherein CuPc is the radical of copper phthalocyanine, is prepared by stirring 87.15 gms. copper phthalocyanine tri-(3)-sulfonyl chloride with ice and water to 900 ml. volume at 0° C., and 3 drops tributyl phosphate are added. The pH is adjusted to 7 by adding 15% aqueous NaOH at room temperature to the cold mass. 51.9 gms. of 43% aqueous NaSH solution at room temperature is added to the cold mass, and the mass is stirred 12–15 hours while being permitted to warm to room temperature naturally. The dye solution is precipitated in the form of its acid solids by adding concentrated HCl until the pH is 2. The acid solids are recovered by filtration, washed with water at room temperature and dried.

50 gms. of the dye solids, 100 gms. $NH_4SCN$ and 30 gms. NaCl are dissolved with water and enough soda ash to give a final volume of 1 liter at pH 7, in preparing the aqueous dyeing composition.

The dyeing is then made as described in Example 4 above.

Example 8

This example is the same as Example 7 above, except that 86.7 gms. nickel phthalocyanine tri-(3)-sulfonyl chloride is substituted for the copper phthalocyanine tri-(3)-sulfonyl chloride of Example 7; and except that 100 gms. S-acetylthiourea is substituted for the $NH_4SCN$ used in Example 7.

Example 9

This example is the same as Example 7 above, except that 80.1 gms. phthalocyanine tri-(4)-sulfonyl chloride is substituted for the copper phthalocyanine tri-(3)-sulfonyl chloride of Example 7; and except that 100 gms. N,N'-diacetylthiourea is substituted for the $NH_4SCN$ used in Example 7.

Example 10

A dye composition is prepared by dissolving 50 gms. dried copper phthalocyanine sulfinic acid having 2 sulfinic acid groups per molecule (prepared according to Example 1 of British Patent 960,643, published June 10, 1964) and 100 gms. trisodium thiocyanurate in water and enough soda ash to give a final volume of 1 liter at pH 8.

The fabric is then dyed with the dye composition by the method described in Example 4.

Example 11

A dye composition is prepared by dissolving 50 gms. dried copper phthalocyanine sulfinic acid having an average of 1.5 sulfinic acid groups per molecule (prepared according to Example 6 of British patent specification 960,-643, published June 10, 1960) and 100 gms. sodium diethyldithiocarbamate in water and enough soda ash to give a final volume of 1 liter at pH 8.

The fabric is then dyed with the dye composition by the method described in Example 4.

Example 12

An aqueous solution of

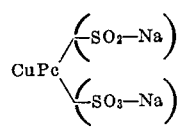

wherein CuPc is the radical of copper phthalocyanine, is prepared by adding 77.3 gms. copper phthalocyanine di-(3)-sulfonyl chloride to a stirring solution of 50.5 gms.

sodium sulfite in 500 ml. water maintained at 20°–30° C. during the addition and also maintained at pH 9–9.5 by adding soda ash as required. The resulting solution is stirred 10 hours at room temperature. 75 gms. NaCl is added, and enough concentrated HCl to precipitate the sulfinate as a sulfinic acid. The sulfinic acid is collected by filtration, washed with 300 ml. 5% aqueous HCl, and dried.

50 gms. of the resulting dry dye solids, 100 gms. thiourea and 200 gms. urea are dissolved with enough water and soda ash to give a final volume of 1 liter at pH 8.

The dye solution is then dyed on the cotton fabric in the manner described in Example 4 above.

Example 13

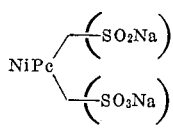

wherein NiPc is the radical of nickel phthalocyanine, is prepared and collected as the acid solids thereof in the same manner described in Example 12 above, except that 76.8 gms. nickel phthalocyanine di-(3)-sulfonyl chloride is substituted for the copper phthalocyanine di-(3)-sulfonyl chloride used in Example 12 above.

The remainder of this example is the same as Example 12 above, except that the amount of thiourea is increased to 200 gms. and the urea is omitted.

Example 14

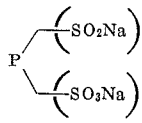

wherein Pc is the radical of phthalocyanine, is prepared and collected as the acid solids thereof in the same manner described in Example 12 above, except that 68.7 gms. phthalocyanine di(3)-sulfonyl chloride is substituted for the copper phthalocyanine di-(3)-sulfonyl chloride used in Example 12 above.

The remainder of this example is the same as Example 12 above, except that 100 gms. $Na_2S_2O_3 \cdot 5H_2O$ is substituted for the thiourea used in Example 12.

Example 15

This example is the same as Example 12 above, except that 100 gms. N-monohexylthiourea is substituted for the thiourea used in Example 12.

Example 16

This example is the same of Example 13 above, except that 100 gms. N,N'-dihexylthiourea is substituted for the thiourea used in Example 13 and except that 50 gms. thiourea is added to the aqueous dye composition.

Example 17

This example is the same as Example 14 above, except that the urea is omitted and except that 50 gms. finely divided elemental sulfur is substituted for the $$Na_2S_2O_3 \cdot 5H_2O$$

used in Example 14.

Example 18

This example is the same as Example 12 above, except that 100 gms. $NH_4SCN$ is substituted for the thiourea used in Example 12.

Example 19

This example is the same as Example 13 above, except that 100 gms. S-acetylthiourea is substituted for the thiourea used in Example 13, and except that 100 gms. urea is added thereto.

Example 20

This example is the same as Example 14 above, except that 100 gms. N,N'-diacetylthiourea is substituted for the $Na_2S_2O_3 \cdot 5H_2O$ used in Example 14.

Example 21

This example is the same as Example 12 above, except that urea is omitted from the dye composition, and except that 100 gms. trisodium thiocyanurate is substituted for the thiourea used in Example 12.

Example 22

This example is the same as Example 13 above, except that 100 gms. sodium diethyldithiocarbamate is substituted for the thiourea used in Example 13.

What is claimed is:

1. A process for coloring cotton textile fibers comprising the steps of applying to the fibers an aqueous composition comprising a water soluble, organic dyestuff which is a sulfinate of the phthalocyanine series selected from the group consisting of phthalocyanine sulfinates, copper phthalocyanine sulfinates and nickel phthalocyanine sulfinates and containing at least one pendant sulfinate group per phthalocyanine molecule as a substituent for hydrogen in the arylene nuclei of the phthalocyanines and a fixing agent selected from the group consisting of $Na_2S_2O_3$, thiourea, N-monoalkyl- and N,N'-dialkyl thioureas the alkyl groups of which contain 1–6 carbon atoms, $NH_4SCN$ elemental sulfur, acetyl thioureas, trisodium thiocyanurate and sodium diethyldithiocarbamate; drying the fibers; heating the fibers at an elevated temperature until the dyestuff is fixed; and washing the fibers.

2. A process as defined in claim 1, and further characterized in that said sulfinate of the phthalocyanine series also has pendant thiosulfinate or pendant sulfonate groups as substituents for hydrogen in the arylene nuclei of the phthalocyanines.

3. A process as defined in claim 1, and further characterized in that said elevated temperature is 380°–425° F.

4. A process as defined in claim 1, and further characterized in that the heating is at 380°–425° F. for 8 seconds–2 minutes.

5. A process as defined in claim 1, and further characterized in that said aqueous composition is neutral or slightly alkaline.

6. A process as defined in claim 2, and further characterized in that the aqueous composition is neutral or slightly alkaline, and in that the heating is at 380°–425° F. for 8 seconds–2 minutes.

References Cited

UNITED STATES PATENTS

| | | | |
|---|---|---|---|
| 2,776,956 | 1/1957 | Zickendraht | 260—145 |
| 3,100,673 | 8/1963 | Ulmer et al. | 8—22 |
| 3,113,824 | 12/1963 | Kohl et al. | 8—37 |
| 3,338,918 | 8/1967 | Geselbracht et al. | 260—314.5 |

NORMAN G. TORCHIN, *Primary Examiner.*

D. LEVY, *Assistant Examiner.*

UNITED STATES PATENT OFFICE
CERTIFICATE OF CORRECTION

Patent No. 3,420,615　　　　　　　　　　　　　January 7, 1969

William S. Griffith

It is certified that error appears in the above identified patent and that said Letters Patent are hereby corrected as shown below:

Column 5, Ex. 14, the formula should appear as shown below

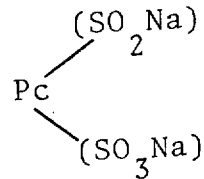

Signed and sealed this 16th day of February 1971.

(SEAL)
Attest:

Edward M. Fletcher, Jr.
Attesting Officer

WILLIAM E. SCHUYLER, JR.
Commissioner of Patents